United States Patent
Saito et al.

(10) Patent No.: US 8,123,129 B2
(45) Date of Patent: Feb. 28, 2012

(54) INFORMATION PROVISION INTERMEDIATION APPARATUS

(75) Inventors: Motonobu Saito, Kawasaki (JP); Keisuke Takita, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 942 days.

(21) Appl. No.: 12/057,588

(22) Filed: Mar. 28, 2008

(65) Prior Publication Data

US 2008/0245859 A1 Oct. 9, 2008

(30) Foreign Application Priority Data

Apr. 5, 2007 (JP) ................. 2007-099006

(51) Int. Cl.
- G06F 19/00 (2011.01)
- G06F 17/50 (2006.01)
- G06K 15/00 (2006.01)
- G06Q 30/00 (2006.01)
- G06Q 90/00 (2006.01)
- G06Q 10/00 (2006.01)
- A01K 5/02 (2006.01)
- G05B 19/00 (2006.01)
- G05B 23/00 (2006.01)
- G08B 13/14 (2006.01)

(52) U.S. Cl. ............ 235/383; 235/385; 705/28; 705/29; 340/572.1; 340/5.92

(58) Field of Classification Search .......... 235/385, 235/380, 375, 383; 705/28, 29; 340/572.1, 340/5.92
See application file for complete search history.

(56) References Cited

U.S. PATENT DOCUMENTS

| | | | | |
|---|---|---|---|---|
| 5,063,507 | A * | 11/1991 | Lindsey et al. ................. | 705/37 |
| 6,073,114 | A * | 6/2000 | Perkins et al. .................. | 705/28 |
| 7,035,877 | B2 * | 4/2006 | Markham et al. .................... | 1/1 |
| 7,274,295 | B2 * | 9/2007 | Koch et al. ................. | 340/572.1 |
| 7,385,529 | B2 * | 6/2008 | Hersh et al. .................... | 340/988 |
| 7,551,089 | B2 * | 6/2009 | Sawyer ....................... | 340/572.4 |
| 7,552,860 | B2 * | 6/2009 | Tani et al. ...................... | 235/375 |
| 7,797,204 | B2 * | 9/2010 | Balent ............................. | 705/28 |
| 2001/0049734 | A1 * | 12/2001 | Suwabe et al. ................ | 709/225 |
| 2001/0056359 | A1 * | 12/2001 | Abreu ............................... | 705/3 |
| 2002/0087408 | A1 * | 7/2002 | Burnett ............................ | 705/14 |
| 2002/0091991 | A1 * | 7/2002 | Castro ........................... | 717/106 |
| 2002/0139848 | A1 * | 10/2002 | Catan ............................. | 235/385 |
| 2003/0050849 | A1 * | 3/2003 | Keller et al. ..................... | 705/26 |
| 2003/0135432 | A1 * | 7/2003 | McIntyre et al. ................ | 705/28 |
| 2004/0039665 | A1 * | 2/2004 | Ouchi ............................ | 705/28 |
| 2005/0114468 | A1 * | 5/2005 | Philyaw ........................ | 709/217 |
| 2005/0154653 | A1 * | 7/2005 | Jongebloed ..................... | 705/28 |

(Continued)

FOREIGN PATENT DOCUMENTS

EP 1 244 043 9/2002

(Continued)

*Primary Examiner* — Daniel Walsh

(74) *Attorney, Agent, or Firm* — Antonelli, Terry, Stout & Kraus, LLP.

(57) ABSTRACT

An information provision intermediation apparatus is disclosed. An information provision intermediation definition table has stored therein, in correspondence with each other, an address of the information providing site of an information providing unit and an information provision condition required for the traceability data at the time of providing the information of the information providing site. A CPU acquires a traceability data group corresponding to the individual commodity ID acquired from a terminal. Based on the acquired traceability data group and the information provision condition, the CPU acquires the address of the information providing site of the information-available information providing unit, and using the acquired address, acquires the information from the information providing site and transmits it to the terminal.

11 Claims, 6 Drawing Sheets

U.S. PATENT DOCUMENTS

| | | | |
|---|---|---|---|
| 2005/0216294 A1* | 9/2005 | Labow | 705/1 |
| 2005/0222723 A1* | 10/2005 | Estes et al. | 701/33 |
| 2005/0289019 A1* | 12/2005 | Chan et al. | 705/28 |
| 2006/0038010 A1* | 2/2006 | Lucas | 235/385 |
| 2006/0054693 A1* | 3/2006 | Kawai | 235/385 |
| 2006/0055552 A1* | 3/2006 | Chung et al. | 340/686.1 |
| 2006/0116936 A1* | 6/2006 | Lucas | 705/28 |
| 2006/0187048 A1* | 8/2006 | Curkendall et al. | 340/572.4 |
| 2006/0282340 A1* | 12/2006 | Morand et al. | 705/28 |
| 2007/0018820 A1* | 1/2007 | Chand et al. | 340/572.1 |
| 2007/0103306 A1* | 5/2007 | Sasaki et al. | 340/572.1 |
| 2007/0181681 A1* | 8/2007 | Jain | 235/385 |
| 2008/0011842 A1* | 1/2008 | Curry et al. | 235/385 |
| 2008/0078834 A1* | 4/2008 | Woodward | 235/385 |
| 2008/0121690 A1* | 5/2008 | Carani et al. | 235/376 |
| 2009/0172035 A1* | 7/2009 | Lessing et al. | 707/104.1 |
| 2009/0322493 A1* | 12/2009 | Kumagai et al. | 340/10.51 |
| 2010/0090004 A1* | 4/2010 | Sands et al. | 235/385 |
| 2010/0187306 A1* | 7/2010 | Solomon | 235/385 |
| 2010/0258627 A1* | 10/2010 | Nakano et al. | 235/385 |

FOREIGN PATENT DOCUMENTS

| | | |
|---|---|---|
| JP | 2006-050506 | 2/2006 |
| WO | WO 01/79988 | 10/2001 |
| WO | WO 2006/137633 | 12/2006 |

* cited by examiner

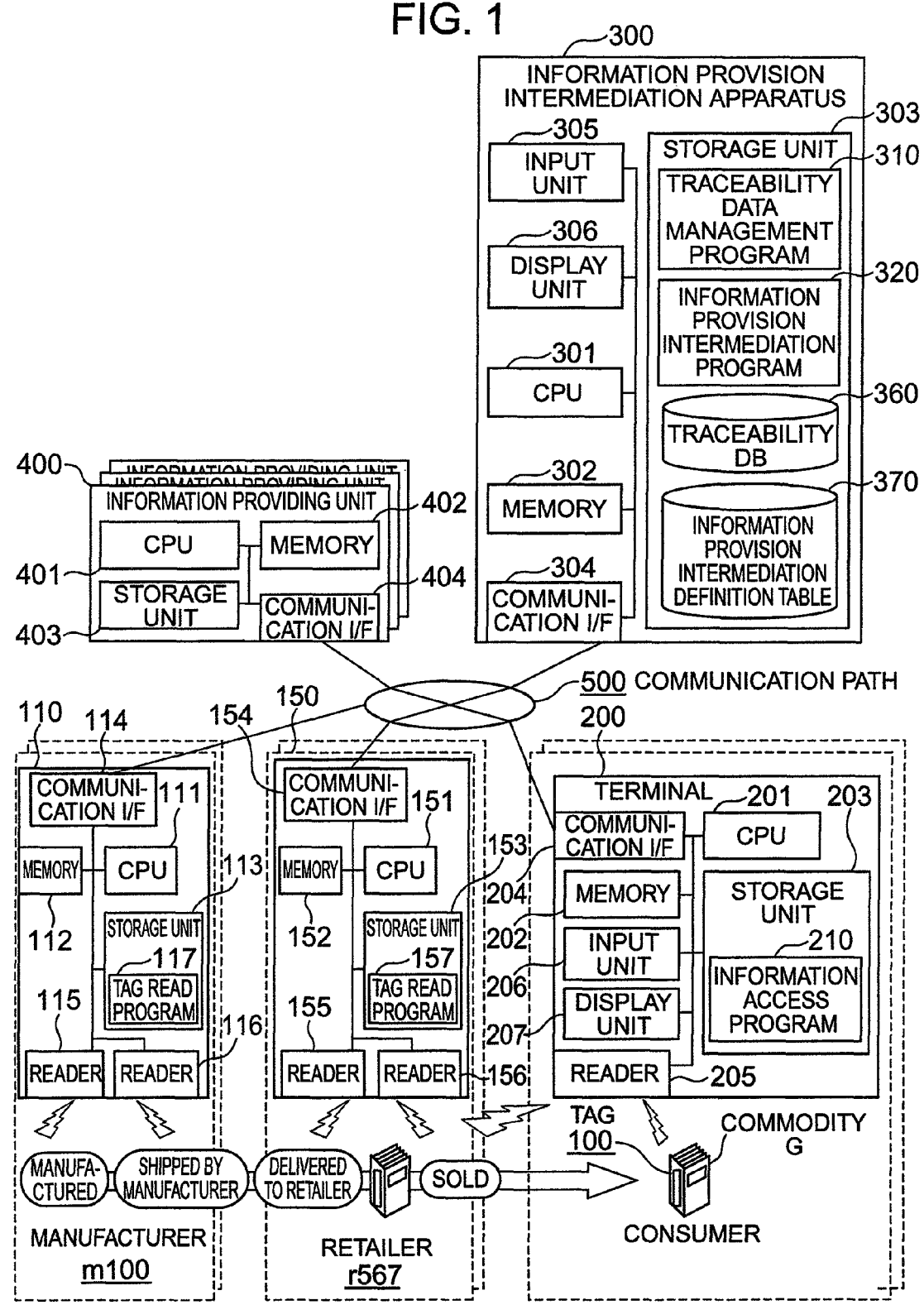

FIG. 2

TRACEABILITY DB

| INDIVIDUAL COMMODITY ID 360a | COMMODITY CODE 360b | STRATEGIC POINT ID 360c | BUSINESS EVENT 360d | DATE/HOUR 360e |
|---|---|---|---|---|
| .. | .. | .. | .. | .. |
| 100100100 | 100100 | m100 | MANUFACTURED | 2007/01/25 10:45:23 |
| 100100100 | 100100 | m100 | SHIPPED BY MANUFACTURER | 2007/01/29 09:23:58 |
| 100100100 | 100100 | r234 | DELIVERED TO RETAILER | 2007/01/29 18:31:11 |
| 100100100 | 100100 | r234 | SOLD | 2007/02/04 15:02:10 |
| 100100101 | 100100 | m100 | MANUFACTURED | 2007/01/25 10:45:30 |
| 100100101 | 100100 | m100 | SHIPPED BY MANUFACTURER | 2007/01/29 09:23:58 |
| 100100101 | 100100 | m100 | DELIVERED TO RETAILER | 2007/01/29 18:31:11 |
| 100100102 | 100100 | m100 | MANUFACTURED | 2007/01/25 10:45:37 |
| .. | .. | .. | .. | .. |
| 100123045 | 100123 | m100 | SHIPPED BY MANUFACTURER | 2007/03/11 11:08:59 |
| 111456078 | 111456 | m111 | SHIPPED BY MANUFACTURER | 2007/01/28 12:41:53 |
| 111456078 | 111456 | r234 | DELIVERED TO RETAILER | 2007/01/28 21:09:20 |
| 200345067 | 200345 | m200 | MANUFACTURED | 2007/02/19 17:02:00 |
| 200345067 | 200345 | m200 | SHIPPED BY MANUFACTURER | 2007/02/20 09:03:29 |
| 200345068 | 200345 | m200 | MANUFACTURED | 2007/02/19 17:02:21 |
| .. | .. | .. | .. | .. |

FIG. 3

INFORMATION PROVISION INTERMEDIATION DEFINITION TABLE 370

| INTERMEDIATION DEFINITION ID 370a | INDIVIDUAL COMMODITY ID 370b | COMMODITY CODE 370c | STRATEGIC POINT ID 370d | BUSINESS EVENT 370e | COLLATERAL CONDITION 370f | PROVIDED INFORMATION NAME 370g | PROVIDED INFORMATION ADDRESS 370h |
|---|---|---|---|---|---|---|---|
| .. | .. | .. | .. | .. | .. | .. | .. |
| m100001 | - | 100100 | - | SOLD | - | CHARACTER STRING RETRIEVAL | 192.0.2.8/inf1 |
| m100002 | - | 100100 | - | DELIVERED TO RETAILER | LATEST BUSINESS EVENT | COMMODITY DESCRIPTION | 192.0.2.8/inf2 |
| m100003 | 100100100 | - | - | SOLD | BEFORE 2007/03/31 | PRIZE WON | 192.0.2.8/inf3 |
| m100004 | - | - | m100 | MANUFACTURED | - | ADVERTISEMENT | 192.0.2.8/ad1 |
| r234001 | - | - | r234 | SOLD | - | ADVERTISEMENT | 192.0.2.3/ad5 |
| .. | .. | .. | .. | .. | .. | .. | .. |
| m200001 | 200345067 | - | - | - | - | RECALL | 192.0.2.7/inf6 |
| m200001 | - | 200345 | r329 | DELIVERED TO RETAILER | - | RECALL | 192.0.2.7/inf6 |
| .. | .. | .. | .. | .. | .. | .. | .. |

INFORMATION PROVISION INTERMEDIATION APPARATUS

INCORPORATION BY REFERENCE

The present application claims priority from Japanese application JP2007-099006 filed on Apr. 5, 2007, the content of which is hereby incorporated by reference into this application.

BACKGROUND OF THE INVENTION

This invention relates to an information provision intermediation apparatus for acting as an intermediary to provide the information at an information providing site.

In order to improve the efficiency and accuracy of business including the delivery and shipment inspection, sale, inventory, recall and order in the retailing field dealing in commodities, it is common practice to print or attach a bar code, a two-dimensional code or a RFID (radio frequency identification) tag (hereinafter collectively referred to as the tag) to each commodity. Further, in an ever increasing number of cases, various information related to commodities such as the production history and the information on related commodities are supplied using the tag in order to promote the sales and add the values of the commodities.

For acquiring the information on the production history of a commodity, however, consumers are required to access a predetermined information providing site for supplying the production history of the commodity using a terminal and input the information contained in the tag attached to the commodity from the terminal.

In order to acquire the information on the production history of a plurality of commodities, therefore, the consumer encounters the problem of the requirement to do the bothersome job of accessing an information providing site different for each commodity and inputting the tag information for each site.

In view of this, a method has been disclosed to acquire the production history (traceability information) of a commodity without being conscious of the existence of a plurality of information providing sites (for example, JP-A-2006-50506).

According to the technique described in JP-A-2006-50506, the commodity traceability information can be acquired without being conscious of the existence of a plurality of information providing sites. Demand has arisen from consumers, however, to acquire various useful information on commodities in addition to the traceability information.

On the other hand, it is the desire on the part of commodity manufacturers and distributors to provide information effectively to consumers who have purchased commodities.

SUMMARY OF THE INVENTION

This invention has been achieved in view of the problems described above, and an object thereof is to provide a technique for providing useful information to consumers.

Another object of the invention is to provide a technique capable of providing consumers with information effectively from commodity manufacturers and distributors.

In order to solve the problems described above, this invention has been achieved with an eye on the traceability data on the distribution history of each commodity in at least a part of the distribution path from the manufacturer to consumers of the commodity.

According to a first aspect of the invention, there is provided an information provision intermediation apparatus connectable, through a communication path, to a terminal used by each consumer and an information providing unit having an information providing site for providing information, wherein the information of the information providing site provided by the information providing unit is provided to the terminal, comprising:

a condition table for storing, in correspondence with each other, an identifier of the information providing site and an information provision condition required for the distribution history information in at least a part of the distribution path after manufacture of a commodity at the time of providing the information on the information providing site;

a distribution history information acquisition unit for acquiring the distribution history information on the commodity designated by the consumer;

an identifier acquisition unit for acquiring the identifier of the information providing site capable of providing information, based on the acquired commodity distribution history information and the information provision condition; and an information intermediation unit for acquiring, using the identifier acquired by the identifier acquisition unit, the information from the information providing site designated by the identifier and transmitting the information to the terminal.

The information provision intermediation apparatus described above may further comprise an individual commodity ID acquisition unit for acquiring the individual commodity ID adapted to identify a predetermined commodity individually, wherein the distribution history information acquisition unit may acquire the distribution history information on the commodity based on the individual commodity ID.

In the information provision intermediation apparatus described above, a RFID tag may be attached to the commodity, and the individual commodity ID acquisition unit may acquire the individual commodity ID read by the terminal from the RFID tag.

The information provision intermediation apparatus described above may further comprise a distribution history information collection unit for collecting the distribution history information from a predetermined external device and a distribution history information accumulation unit for accumulating the distribution history information thus collected, wherein the distribution history information acquisition unit may acquire the distribution history information on the predetermined commodity from the distribution history information accumulation unit.

Also, in the information provision intermediation apparatus described above, the RFID tag may be attached to the commodity and may store therein the distribution history information on the particular commodity, and the distribution history information acquisition unit may acquire the distribution history information from the terminal.

In the information provision intermediation apparatus described above, the distribution history information may include the individual commodity ID of a commodity, a strategic point ID for uniquely identifying the strategic point where the commodity of the individual commodity ID is located in the distribution path, and the business event specifying information for specifying a business event involving the commodity of the individual commodity ID at the particular strategic point, wherein the information provision condition may include the condition for at least one of the individual commodity ID, the strategic point ID and the business event specifying information.

In the information provision intermediation apparatus described above, the information provision condition may include the condition for the strategic point ID and the business event specifying information.

In the information provision intermediation apparatus described above, the information provision condition may include the condition for the individual commodity ID and the business event specifying information.

Also, in the information provision intermediation apparatus described above, the distribution history information may further include the information on the date/hour of generation of the distribution history information, the information provision condition may include the condition for the individual commodity ID and the latest business event specifying information, and the identifier acquisition unit may specify the latest business event specifying information in the distribution history information based on the date/hour information and may acquire the identifier of the information-available information providing site based on the specified business event specifying information and the business event specifying information included in the information provision condition.

Also, in the information provision intermediation apparatus described above, the condition for the latest business event specifying information may be the condition that the business event specifying information specify the business event before the sale of the particular commodity, and the identifier of the information providing site corresponding to the information provision condition may identify the information providing site for providing the descriptive information on the commodity.

In the information provision intermediation apparatus described above, the information provision condition may include the term before which the information on the information providing site can be provided.

The information provision intermediation apparatus described above, having a plurality of information providing sites, may further comprise a select screen transmitter for transmitting, upon acquisition of the identifiers of a plurality of the information providing sites by the identifier acquisition unit, a select screen to the terminal for selecting any one of the plurality of the information providing sites, and a select receiver for receiving the information providing site selected on the select screen by the terminal, wherein the information intermediation unit may acquire the information from the information providing site received by the select receiver and transmits it to the particular terminal.

In the information provision intermediation apparatus described above, the information providing sites may include an advertisement information providing site for providing the advertisement information, and the select screen transmitter, upon acquisition of the identifiers of a plurality of information providing sites other than the advertisement information providing site for providing the advertisement information, may transmit a select screen to the terminal for selecting the information providing site from those other than the advertisement information.

Also, in the information provision intermediation apparatus described above, upon acquisition of the identifier of the advertisement providing site by the identifier acquisition unit, the information intermediation unit may acquire the information from both the information providing site received by the select receiver and the advertisement information providing site, and transmit the information from both the information providing site and the advertisement information providing site to the terminal.

In the information provision intermediation apparatus described above, the commodity may be a book, and the information providing site may include a site for providing the information for receiving the character string to retrieve the point of description in the book and a site for retrieving the point of description of the character string in the book and providing the information on the point of description, while the information intermediation unit may provide the terminal with the information for receiving the character string.

In the information provision intermediation apparatus described above, the commodity may be a book, and the information providing site may include an advertisement information providing site for providing the advertisement information on the book, while the information intermediation unit may provide the terminal with the advertisement information on the book.

In order to achieve the objects described above, according to a second aspect of the invention, there is provided an information provision intermediation method using an information provision intermediation apparatus for providing the terminal with the information on the information providing site provided by the information providing unit, wherein the information provision intermediation apparatus includes a condition table for storing, in correspondence with each other, an identifier of the information providing site and an information provision condition required for the distribution history information in at least a part of the distribution path after manufacture of the commodity at the time of providing the information of the information providing site, wherein the distribution history information acquisition unit of the information provision intermediation apparatus acquires the distribution history information on the commodity designated by the consumer, wherein the identifier acquisition unit of the information provision intermediation apparatus acquires the identifier of the information-available information providing site based on the acquired commodity distribution history information and the information provision condition, and wherein the information intermediation unit of the information provision intermediation apparatus acquires the information from the information providing site designated by the identifier and transmits the information to the terminal using the identifier acquired by the identifier identification acquisition unit.

In order to achieve the objects described above, according to a third aspect of the invention, there is provided an information provision intermediation program executed by a computer communicable through a communication path, wherein the computer includes a condition table for storing, in correspondence with each other, an identifier of the information providing site and an information provision condition required for the distribution history information in at least a part of the distribution path after manufacture of the commodity at the time of providing the information on the information providing site, and wherein the computer functions as a distribution history information acquisition unit for acquiring the distribution history information on the commodity designated by the consumer, an identifier acquisition unit for acquiring the identifier of the information-available information providing site based on the acquired commodity distribution history information and the information provision condition and an information intermediation unit for acquiring the information from the information providing site indicated by the identifier and transmitting it to the terminal using the identifier acquired by the identifier acquisition unit.

In order to achieve the objects described above, according to a fourth aspect of the invention, there is provided an information providing system comprising a terminal used by the consumer, an information providing unit having an information providing site for providing the information and an information provision intermediation apparatus for providing the terminal with the information on the information providing site provided by the information providing unit, wherein the terminal includes a reader for reading the individual commodity ID capable of individually identifying a commodity designated by the consumer from the tag attached to the commodity and an individual commodity ID transmitter for transmitting the read individual commodity ID to the information provision intermediation apparatus, wherein the information provision intermediation apparatus includes a condition table for storing, in correspondence with each other, an identifier of the information providing site and an information provision condition required for the distribution history information in at least a part of the distribution path after manufacture of the commodity at the time of providing the information on the information providing site, an individual commodity ID acquisition unit for acquiring the individual commodity ID from the terminal, a distribution history information acquisition unit for acquiring the distribution history information on the commodity based on the individual commodity ID, an identifier acquisition unit for acquiring the identifier of the information-available information providing site based on the acquired commodity distribution history information and the information provision condition, and an information intermediation unit for acquiring the information from the information providing site indicated by the identifier and transmitting it to the terminal using the identifier acquired by the identifier acquisition unit.

In the information providing system described above, the RFID tag is attached to the commodity and has stored therein the individual commodity ID of the particular commodity, and the reader reads the individual commodity ID from the RFID tag.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the configuration of an information providing system according to an embodiment of the invention.

FIG. 2 is a diagram showing the configuration of an example of a traceability DB according to an embodiment of the invention.

FIG. 3 is a diagram showing the configuration of an example of an information provision intermediation definition table according to an embodiment of the invention.

DESCRIPTION OF THE INVENTION

Figure 4:
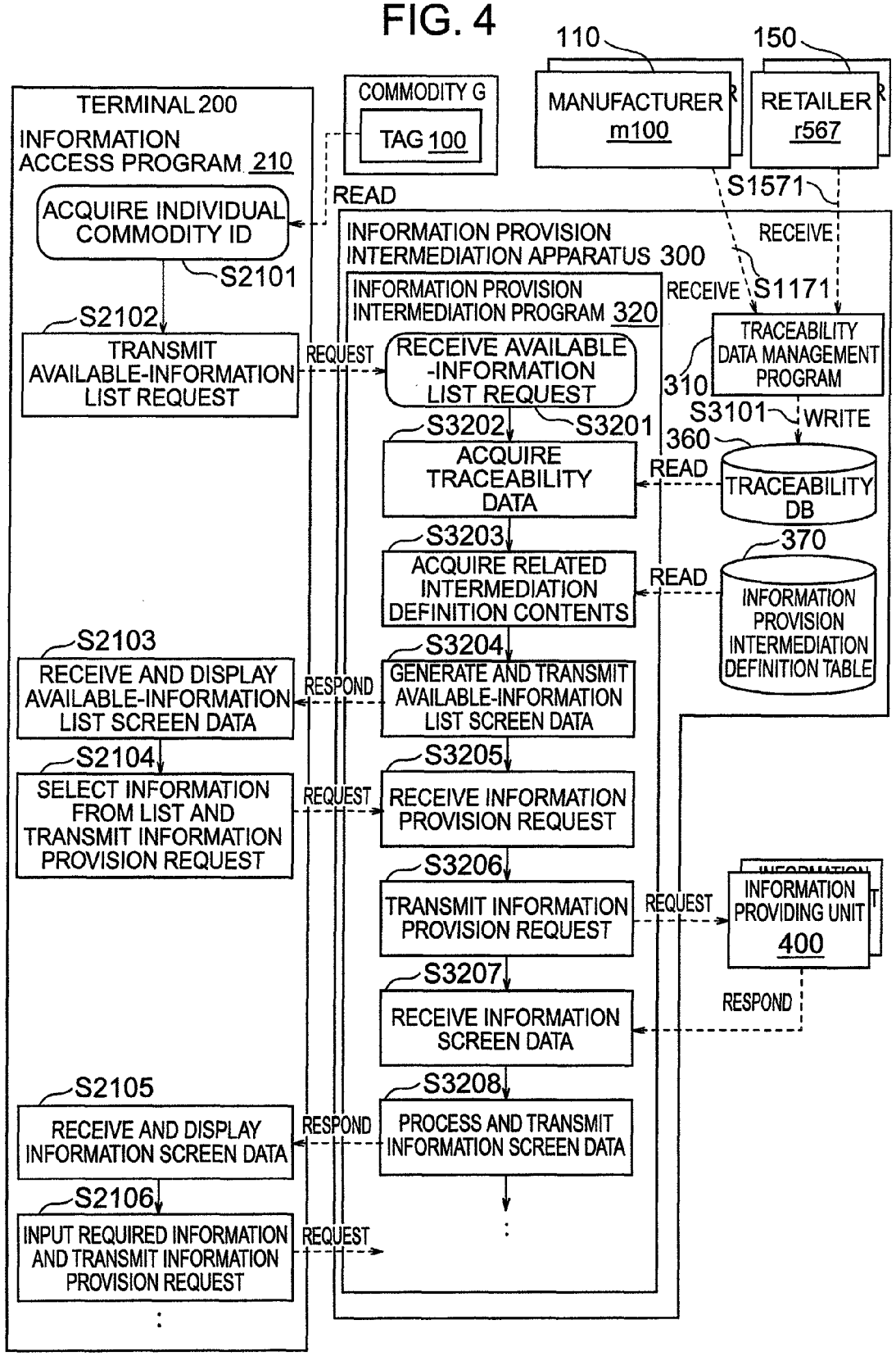
FIG. 4 is a flowchart showing the process in the information providing system according to an embodiment of the invention.

Embodiments of the invention are explained below with reference to the accompanying drawings. The embodiments described below should never be interpreted in any way to limit the invention defined in the scope of the claims, and all the combinations of the features described in the embodiments are not necessarily essential as a solving means of the invention.

FIG. 1 is a diagram showing the configuration of an information providing system according to an embodiment of the invention.

The information providing system comprises an information provision intermediation apparatus 300, at least one information providing unit 400, at least one terminal 200, at least one history information generating unit 110, and at least one history information generating unit 150. The history information generating units 110, 150 correspond to an external device. The information provision intermediation apparatus 300, the information providing unit 400, the terminal 200, the history information generating unit 110 and the history information generating unit 150 are connected to a communication path 500. The communication path 500 is a mobile phone network or a standardized communication path such as a wired LAN (local area network) or a radio LAN.

The information providing system manages the distribution history of each of a plurality of commodities G (for example, books) in the distribution path after manufacture to the purchase thereof by consumers. As an example of the distribution path after manufacture of the commodities G, the commodities G manufactured by the manufacturer are shipped by the manufacturer and delivered to retailers. The commodities, after being delivered to the retailers, can be confirmed by consumers. After that, the commodities G are sold to the consumers by the retailers.

In the information providing system, each commodity G carries a tag 100. The tag 100 is, for example, a bar code, a two-dimensional code or a RFID tag. The tag 100 includes an individual commodity ID whereby each commodity G can be uniquely identified. The individual commodity ID makes it possible to identify the commodities of the same type one by one.

The history information generating unit 110 is a device arranged at a strategic point of the manufacturer, and includes a CPU 111, a memory 112, a storage unit 113, a communication interface 114, a reader 115 and a reader 116.

The communication interface 114 is, for example, a LAN interface such as a wired LAN card or a radio LAN card, and through the communication path 500, communicates with other devices such as the information provision intermediation apparatus 300. The readers 115, 116 are, for example, bar code readers, two-dimensional code readers or RFID readers to read the information such as the individual commodity ID from the tag 100 added to the commodities G. According to this embodiment, the reader 115 is arranged at a position adapted to read the information from the commodities after manufacture at the strategic point of the manufacturer, while the reader 116 is arranged at a position adapted to read the information from the commodities at the time of shipment at the strategic point of the manufacturer.

The storage unit 113 is, for example, a device such as a hard disk drive or a flash memory for storing a program or data. The storage unit 113 has stored therein a tag read program 117. The tag read program 117 causes a CPU 111 to execute the process of reading the individual commodity ID through the readers 115, 116, the process of generating the traceability data corresponding to the strategic point ID, the business event and the read date/hour for the individual commodity ID that has been read and the process of transmitting the generated traceability data to the information provision intermediation apparatus 300 through the communication interface 114. The term "traceability" is defined as the data by which the distribution of the commodity can be tracked subsequently and which is the information on the commodities in at least a part of the distribution route after manufacture thereof and corresponds to the distribution history information or a part thereof.

The memory 112 is used as an area for storing the program or data, or a working area for storing the program or data used in the process executed by the CPU 111. The CPU 111 controls the operation of the parts 112 to 117. Also, the CPU 111 executes a program such as a tag read program 117 stored in the storage unit 113 by reading it out to the memory 112.

The history information generating unit 150 is a device arranged at the strategic point of the retailer. The history information generating unit 150 includes a CPU 151, a memory 152, a storage unit 153, a communication interface 154, a reader 155 and a reader 156.

The communication interface 154 is, for example, a LAN interface such as a wired LAN card or a radio LAN card, and communicates with other devices such as the information provision intermediation apparatus 300 through the communication path 500. The readers 155, 156 are, for example, bar code readers, two-dimensional code readers or RFID readers, and read the information such as the individual commodity ID contained in the tag 100 attached to the commodities G. According to this embodiment, the reader 155 is arranged at a position adapted to read the information on the delivered commodities at the strategic point of the retailers, and the reader 156 at a position adapted to read the information on the commodities at the time of sale thereof at the strategic point of the retailers.

The storage unit 153 is, for example, a device such as a hard disk drive or a flash memory for storing the program or data. The storage unit 153 has stored therein a tag read program 157. The tag read program 157 causes the CPU 151 to execute the process of reading the individual commodity ID from the tag 100 through the readers 155, 156, the process of generating the traceability data with the corresponding strategic ID, business event name and reading date/hour for the individual communication ID that has been read, and the process of transmitting the generated traceability data to the information provision intermediation apparatus 300 through the communication interface 154.

The memory 152 is used as an area for storing the program or data, or a working area for storing the program or data used for the process executed by the CPU 151. The CPU 151 controls the operation of the parts 152 to 157. Also, the CPU 151 executes the program such as the tag read program 157 stored in the storage unit 153 by reading it out to the memory 152.

The terminal 200, used by the consumers, communicates with the information provision intermediation apparatus 300 through the communication path 500 and acquires the information on the commodity desired by the consumers. The terminal 200 includes a CPU 201, a memory 202, a storage unit 203, a communication interface 204, a reader 205 as an example of the reading unit, an input unit 206 and a display unit 207. The terminal 200 can be configured of, for example, a mobile phone, a PDA (personal digital assistant), a PC (personal computer) or a notebook-sized PC with the reader 205 built therein or attached on the outside thereof. Incidentally, the terminal 200 is not limited to the devices held by the consumers, but may be any device prepared at the strategic point of retailers and available for use by consumers.

The communication interface 204 is, for example, a LAN interface such as a wired LAN card, a radio LAN card or a mobile phone interface including a mobile phone antenna, and communicates with other devices such as the information provision intermediation apparatus 300 through the communication path 500.

The reader 205 is, for example, a bar code reader, a two-dimensional code reader or a RFID reader adapted to read the information such as the individual commodity ID contained in the tag 100 attached to the commodities G. Incidentally, according to this embodiment, each consumer can read the information also from the tag 100 of the commodity G purchased by him/her from a retailer by using the reader 205 of the terminal 200, or can bring the terminal 200 to the strategic point of the retailer and read the information from the tag 100 of the commodity G exhibited there for sale.

The input unit 206 is, for example, a device such as an input button, a touch panel, a keyboard or a mouse used by the consumer to make various input operations. The display unit 207 is, for example, a device such as a liquid crystal display for displaying various information. The storage unit 203 is, for example, a device such as a hard disk drive or a flash memory for storing the program or data. The storage unit 203 has stored therein an information access program 210. The information access program 210 causes the CPU 201 to execute the process of reading the individual commodity ID from the tag 100 through the reader 205, the process of notifying the individual commodity ID to the information provision intermediation apparatus 300 through the communication interface 204, the process of acquiring a screen (select screen) for displaying a list of information names related to the individual commodity ID and the process of acquiring, by intermediation of the information provision intermediation apparatus 300, the information selected from the list screen by the consumer through the input unit 206.

The memory 202 is used as an area for storing the program or data, or a working area for storing the program or data used for the process executed by the CPU 201. The CPU 201 controls the operation of the parts 202 to 207. Also, the CPU 201 executes the program such as the information access program 210 stored in the storage unit 203 by read it out into the memory 202. According to this embodiment, the individual commodity ID transmitter is mainly configured so that the CPU 201 executes the information access program 210 stored in the storage unit 204.

The information providing unit 400 is prepared by the manufacturer, the retailers or other various businesses to provide the information related to the commodities or the advertisement information to the consumers. The information providing unit 400 manages the commodity information and the advertisement information and provides them to the devices connected to the communication path 500. According to this embodiment, the information providing unit 400 provides a character string retrieval site for retrieving the point of description of a character string in a book or the advertisement information on a book.

The information providing unit 400 includes a CPU 401, a memory 402, a storage unit 403 and a communication interface 404. The information providing unit 400 can be configured of, for example, a PC.

The communication interface 404 is, for example, a LAN interface such as a wired LAN card or a radio LAN card, and communicates with the information provision intermediation apparatus 300 through the communication path 500. The storage unit 403 is, for example, a device such as a hard disk drive or a flash memory for storing the program or data. According to this embodiment, the storage unit 403 stores the information on the web page of the information providing site to be provided to the consumers and the information and program for generating the web page. The storage unit 403 of the information providing unit 400 for providing a character string retrieval site, for example, stores a table showing, in correspondence with each other, a character string and a point of description of the character string for each of a plurality of books constituting the commodities G, and also a retrieval program for causing the CPU 401 to execute the process of retrieving the point of description using the correspondence table based on the character string received. The memory 402 is used as an area for storing the program or data, or a working area for storing the program or data used for the process executed by the CPU 401. The CPU 401 controls the operation of the parts 402 to 404. Also, the CPU 401 reads and executes the program stored in the storage unit 403 by reading it out to the memory 202. The CPU 401, upon receipt of a request from the information providing site, for example, transmits the web page of the information providing site meeting the request to the requester. Also, the CPU 401 of the information providing unit 400 for providing the character string retrieval site, upon receipt of a display request, transmits the web page for inputting the character string to be retrieved to the requester, and upon receipt of the character string to be retrieved, retrieves the point of description of the particular character string in a book from the correspondence table and transmits the page (the character string retrieval result screen) containing the information on the point of description to the requester.

The information provision intermediation apparatus 300 is a device for executing the process of providing the information as an intermediary of the information providing unit 400 to the terminal 200. The information provision intermediation apparatus 300 includes a CPU 301, a memory 302, a storage unit 303, a communication interface 304, an input unit 305 and a display unit 306. The information provision intermediation apparatus 300 is configured of, for example, a PC.

The communication interface 304 is a LAN interface such as a wired LAN card or a radio LAN card, and communicates with the terminal 200 or the information providing unit 400 through the communication path 500. The input unit 305 is, for example, a device such as an input button, a touch panel, a keyboard or a mouse used by the manager of the information provision intermediation apparatus 300 to make various input operations. The display unit 306 is, for example, a device such as a liquid crystal display for displaying various information. The storage unit 303 is, for example, a device such as a hard disk drive or a flash memory for storing the program or data. The storage unit 303 stores a traceability data management program 310 and an information provision intermediation program 320 on the one hand and stores the traceability DB 360 as an example of a distribution history information accumulation unit and an information provision intermediation definition table 370 as an example of the condition table on the other hand.

The traceability DB 360 is a data base for managing the traceability data on the commodities.

FIG. 2 is a diagram showing a configuration of an example of the traceability data according to an embodiment of the invention.

The traceability DB 360 manages a record including an individual commodity ID field 360*a*, a commodity code field 360*b*, a strategic point ID field 360*c*, a business event field 360*d* and a date/hour field 360*e*. The traceability DB 360 manages each traceability data received from the history information generating units 110, 150 as a record.

The individual commodity ID field 360*a* stores the individual commodity ID in the traceability data received.

The commodity code field 360*b* has set therein the commodity code for uniquely specifying the type of the commodity specified by the individual commodity ID of the individual commodity ID field in the same record. Incidentally, in the case where the individual commodity ID is configured to include the commodity code, the commodity code field 360*b* may be done without. In this case, the commodity code can be acquired from the individual commodity ID stored in the individual commodity ID field 360*a*. Also, a separate table indicating the correspondence between the individual commodity ID and the commodity code may be prepared. By doing so, the commodity code field 360*b* in the traceability DB 360 may be eliminated. Then, the commodity code corresponding to the individual commodity ID can be acquired from the separate table.

The strategic point ID field 360*c* has set therein the strategic point ID for uniquely specifying the strategic point where the traceability data is generated. An ID for uniquely specifying a business organization such as a manufacturer or a retailer, for example, may be used as a strategic point ID. Also, the strategic ID may be the one for uniquely specifying each factory of each manufacturer or each outlet of each retailer.

The business event field 360*d* has set therein the business event name (business event specifying information) indicating the business relating to the commodity for which the traceability data is generated. For example, the business event "manufactured" is set for the traceability data generated in the commodity manufacturing business of the manufacturer, "shipped by manufacturer" for the traceability data generated in the commodity shipment by the manufacturer, "delivered to retailer" for the traceability data generated in the commodity delivery to the retailer, and "sold" for the traceability data generated in the commodity sale by the retailer. The date/hour field 360*e* has set therein the date/hour at which the traceability data is generated.

Returning to FIG. 1, the information provision intermediation definition table 370 is for managing the name of the information provided and the necessary condition to provide the particular information (information provision condition) for the traceability data to be processed. With this information provision intermediation definition table 370, the manager of the information provision intermediation apparatus 300 can confirm the contents displayed on the display unit 306 while at the same time setting them through the input unit 305 of the information provision intermediation apparatus 300. Specifically, the CPU 301 causes the information provision intermediation definition table 370 to be displayed on the display unit 306, and in accordance with the input operation of the manager by way of the input unit 305, adds, updates or changes the information provision intermediation definition table 370. In this way, the information providing site for providing the information can be added or deleted at an arbitrary time point. Even after the commodity has been shipped, therefore, the information providing site can be added.

FIG. 3 is a diagram showing the configuration of an example of the information provision intermediation definition table according to an embodiment of the invention.

The information provision intermediation definition table 370 manages a record including an intermediation definition ID field 370*a*, an individual commodity ID field 370*b*, a commodity code field 370*c*, a strategic point ID field 370*d*, a business event field 370*e*, a collateral condition field 370*f*, a provided information name field 370*g* and a provided information address field 370*h*.

The intermediation definition ID field 370*a* has set therein an intermediation definition ID for uniquely specifying the particular record. The individual commodity ID field 370*b* has set therein the individual commodity ID as an example of the information provision condition. Specifically, the inclusion of the individual commodity ID in the traceability data to be processed is the necessary condition for providing the information of the information providing site indicated by the particular record. In the case where the necessary condition for the individual commodity ID is not required, the individual commodity ID field 370b has set therein "–". The commodity code field 370c has set therein the commodity code as an example of the information provision condition. Specifically, the inclusion of the commodity code in the traceability data to be processed is the necessary condition for providing the information of the information providing site indicated by the particular record. Incidentally, in the case where the necessary condition for the commodity code is not required, the commodity code field 370c has set therein "–".

The strategic point ID field 370d has set therein a strategic point ID as an example of the information provision condition. Specifically, the inclusion of the strategic point ID in the traceability data to be processed is the necessary condition for providing the information of the information providing site indicated by the particular record. In the case where the necessary condition for the strategic point ID is not required, "–" is set in the strategic point ID field 370d. The business event field 370e has set therein the business event name as an example of the information provision condition. Specifically, the inclusion of the business event name in the traceability data to be processed is the necessary condition for providing the information of the information providing site indicated by the particular record. Incidentally, in the case where the necessary condition for the business event for the traceability is not required, "–" is set in the business event field 370e.

The collateral condition field 370f has set therein the necessary condition for the traceability data to be processed for other than the conditions that can be set for the individual commodity ID field 370b, the commodity code field 370c, the strategic point field 370d and the business event field 370e. In the case where the "latest business event" is set in the collateral condition field 370f, for example, the latest traceability data for the individual commodity involved is the necessary condition. In the case where the collateral condition field 370f has set therein the condition for the term such as "2007/03/31", on the other hand, the traceability data generated before the particular term for the individual commodity involved constitutes the necessary condition. In this example, the record of the traceability before "2007/03/31" as the date/hour of the date/hour field 360e is the necessary condition.

According to this embodiment, in the case where the conditions are set in a plurality of any ones of the individual commodity ID field 370b, the commodity code field 370c, the strategic point ID field 370d, the business event field 370e and the collateral condition field 370f of the same record, then it is necessary to meet all the conditions set for providing the information. With this information provision intermediation definition table 370, the information provided can be properly switched in accordance with the commodity distribution route and the state of the business for the commodity.

The provided information name field 370g has set therein the name of the information which can be provided in the case where all the conditions set in the record are met. The provided information address field 370h has set therein an identifier (address) indicating the place holding the available information (the information providing unit 400 or the information providing site therein) in the case where all the conditions set in the record are met.

In the information provision intermediation definition table 370, the record with the intermediation definition ID field 370a of "m100001", for example, indicates that the commodity code is "100100", and in the case where the traceability data with the business event "sold" is to be processed, the information "character string retrieval" can be provided and the particular information is "192.0.2.8/inf1".

Also, the record with the intermediation definition ID field 370a of "m100002" indicates that the commodity code is "100100" and in the case where the latest traceability data with the business event name "delivered to retailer" is to be processed, the information "commodity description" can be provided and the particular information is "192.0.2.8/inf2". This record makes it possible to judge that the information in the commodity description can be provided in the case where the business event for the latest traceability data to be processed is "delivered to retailer", i.e. in the case where the corresponding commodity is delivered to the retailer but not yet sold. Thus, the descriptive information about the commodity before being sold can be provided to the consumers.

Also, the record with the intermediation definition ID field 370a of "r234001" indicates that the strategic point ID is "r234", and in the case where the traceability data with the business event "sold" is to be processed, the advertisement information can be provided and the advertisement information is "192.0.2.3/ad1".

Returning to the description of FIG. 1, the traceability data management program 310 causes the CPU 301 to execute the process in which the traceability data transmitted from the history information generating units 110, 150 is registered in the traceability DB 360. Incidentally, this process is explained in detail later. The information provision intermediation program 320, on the other hand, causes the CPU 301 to execute the process of reading, from the traceability DB 360, all the traceability data (traceability data or traceability data groups) related to the individual commodity ID notified from the terminal 200 through the communication interface 304, the process of specifying the available information based on the information provision intermediation definition table 370 and the traceability data (groups), and the process of acquiring the information from the information providing unit 400 and transmitting it to the terminal 200. These processes are explained in detail later.

The memory 302 is used as an area for storing the program and data, or as a working area for storing the program and data used for the process executed by the CPU 301. The CPU 301 controls the operation of the parts 302 to 306. Also, the CPU 301 executes the programs such as the traceability data management program 310 and the information provision intermediation program 320 stored in the storage unit 303 by reading them out into the memory 302.

Next, the processing operation in the information providing system according to an embodiment of the invention is explained.

FIG. 4 is a flowchart of the process executed in the information providing system according to an embodiment of the invention.

At the strategic point of the manufacturer, when completing the manufacture of the commodity G or shipping the manufactured commodity G, the CPU 111 of the history information generating unit 110 of the manufacturer reads, by means of the reader 115 or 116, the individual commodity ID from the tag 100 of the commodity G, generates the traceability data including the particular individual commodity ID in correspondence with the strategic point ID, business event name and the read date/hour, and transmits the traceability data to the information provision intermediation apparatus 300 through the communication interface 114 (step S1171).

At the strategic point of the retailer, on the other hand, when the commodity G is delivered or sold, the CPU 151 of the history information generating unit 150 of the retailer reads the individual commodity ID from the tag 100 of each commodity G through the reader 155 or 156, generates the traceability data including the particular individual commodity ID in correspondence with the strategic point ID, business event name and the read date/hour, and transmits the particular traceability data to the information provision intermediation apparatus 300 through the communication interface 154 (step S1571).

In the information provision intermediation apparatus 300, the CPU 301 for executing the traceability data management program 310 receives the traceability data transmitted from the history information generating units 110, 150 through the communication interface 304, and writes the contents of the received traceability data in the traceability DB 360 (step S3101). Specifically, the CPU 301 adds a new record to the traceability DB 360, so that the individual commodity ID, strategic point ID, business event name and the date/hour included in the traceability data are written in the corresponding fields 360*a*, 360*c*, 360*d*, 360*e* of the added record. Further, the CPU 301 cuts out the commodity ID part of the individual commodity ID (say, the most significant six digits of the individual commodity ID), and writes it in the commodity ID field 360*b*. As a result, the traceability data in the distribution route of the commodity G are sequentially stored in the traceability DB 360.

In the case where the consumer at the terminal 200 gives an instruction to read the information from the tag 100 attached to the commodity G, on the other hand, the CPU 201 of the terminal 200 starts to execute the information access program 210 and reads the individual commodity ID from the tag 100 of the commodity G through the reader 205 (step S2101). The consumer reads the individual commodity ID from the tag 100 of the commodity G either from the tag 100 of the commodity G not purchased at the strategic point of the retailer or from the tag 100 of the commodity G purchased by the consumer.

Then, the CPU 201 transmits an available information list request including the individual commodity ID that has been read to the information provision intermediation apparatus 300 (step S2102). The available information list request is defined as a request for a list (screen) indicating the names of the available information related to the commodity G indicated by the individual commodity ID.

In the information provision intermediation apparatus 300, the CPU 301 executing the information provision intermediation program 320 receives, through the communication interface 304, the available information list request transmitted from the terminal 200 (step S3201). Then, the CPU 301 acquires, from the traceability DB 360, all the traceability data (traceability data groups) related to the individual commodity ID included in the request (step S3202). In the case where the individual commodity ID included in the available information list request, i.e. the individual commodity ID read in step S2101 is "100100100", for example, the record with the individual commodity ID "100100100" is acquired from the traceability DB 360. Assume that the record is designated in the form of (individual commodity ID field 360*a*, commodity code field 360*b*, strategic point ID field 360*c*, business event field 360*d*, date/hour field 360*e*). Then, specifically, the four records including the record (100100100, 100100, m100, manufactured, 2007/01/25 10:45:23), the record (100100100, 100100, m100, shipped by manufacturer, 2007/01/29 09:23:58), the record (100100100, 100100, r234, delivered to retailer, 2007/01/29 18:31:11) and the record (100100100, 100100, r234, sold, 2007/02/04 15:02:10) are acquired.

Next, the CPU 301 for executing the information provision intermediation program 320 acquires those records defined in the information provision intermediation definition table 370 for which the acquired traceability data (group) satisfies the condition (step S3203). In the case where the individual commodity ID in the available information list request is "100100100", for example, the four records with the intermediation definitions "m100001", "m100003", "m100004" and "m234001", respectively, for which the acquired traceability data satisfy the condition are acquired.

Specifically, the record with the intermediation definition ID "m100001" including the condition that the commodity code is "100100" and the business event name is "sold" is acquired since the traceability data (100100100, 100100, r234, sold, 2007/02/04 15:02:10) satisfying the condition is included in the traceability group. Also, the record with the intermediation definition ID "m100003" including the condition that the date/hour is "2007/03/31", the individual commodity ID "100100100" and the business event name "sold" is acquired since the traceability data (100100100, 100100, r234, sold, 2007/02/04 15:02:10) satisfying this condition is included in the traceability data group. Similarly, the record with the intermediation definition ID "m100004" including the condition that the strategic point ID is "m100" and the business event name "manufactured" is acquired since the traceability data (100100100, 100100, m100, manufactured, 2007/01/25 10:45:23) satisfying this condition is included in the traceability data group. Further, the record with the intermediation definition ID "r234001" including the condition that the strategic point ID is "r234" and the business event name "manufactured" is acquired since the traceability data (100100100, 100100, r234, sold, 2007/02/04 15:02:10) satisfying this condition is included in the traceability data group. Incidentally, the record with the intermediation definition ID "m100002" including the condition that the traceability data involved has the latest date/hour in the traceability data group and the business event name is "delivered to retailer" (i.e. the particular commodity is delivered to the retailer but not yet sold) is not acquired since the traceability data satisfying this condition is not included in the traceability data group.

The CPU 301 for executing the information provision intermediation program 320 extracts the records with the provided information name other than "advertisement", among the records acquired from the information provision intermediation definition table 370, and by generating an available information list screen to allow the consumer to select one or a plurality of the available information included in the extracted records, transmits it to the terminal 200 (step S3204). In the case where the individual commodity ID read in step S2101 is "100100100", the records with the intermediation definition IDs of "m100001" and "m100003" having the provided information name other than "advertisement" are extracted thereby to generate the available information list screen data for causing the consumer to select the information "character string retrieval" and "prize won" set in the provided information name field 370*g* of these records. According to this embodiment, in step S3204, the CPU 301 stores in the memory 302, in correspondence with each other, the records extracted in step S3203 and the identification information (for example, the session ID) whereby the terminal 200 transmitting the available information list screen data can be specified.

In the terminal 200, upon receipt of the available information list screen data from the information provision intermediation apparatus 300, the CPU 201 displays the available information list screen on the display unit 207 (step S2103).

Figure 5:
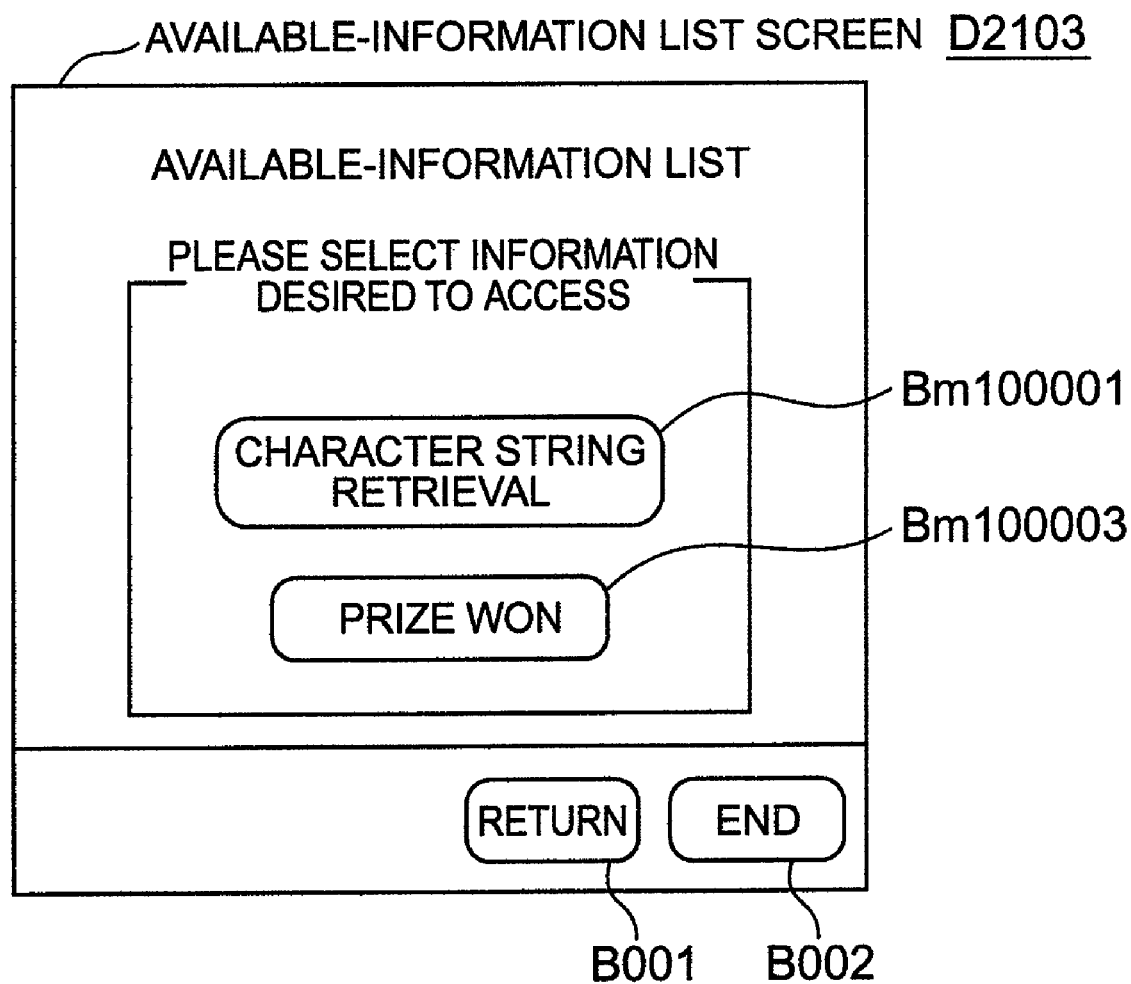
FIG. 5 is a diagram showing an available-information list screen according to an embodiment of the invention.

FIG. 5 is a diagram showing the available information list screen according to an embodiment of the invention. In FIG.

5, the available information list screen D2103 for selecting the information "character string retrieval" and "prize won" is illustrated.

The available information list screen D2103 includes a "character string retrieval" button Bm100001 for selecting the character string retrieval constituting one of the selectable information, a "prize won" button Bm100003 for selecting "prize won" constituting one of the selectable information, a return button B001, an end button B002 and the description of the particular screen. In the case where the consumer selects the return button B001 by operating the input unit 206, the CPU 201 executing the information access program 210 displays the previously displayed screen. In the case where the consumer selects the end button B002 by operating the input unit 206, on the other hand, the CPU 201 executing the information access program 210 ends the execution of the information access program 210. Also, in the case where the consumer selects the "character string retrieval" button Bm100001 or the "prize won" button Bm100003 by the operation of the input unit 206, the CPU 201 executing the information access program 210 transmits an information provision request requesting the provision of the information corresponding to the selected button to the information provision intermediation apparatus 300. The information provision request includes an index for specifying the selected information uniquely such as the name of the information of which the provision is requested (provision requested information name).

Returning to the description of FIG. 4, the CPU 201 executing he information access program 210 transmits the information provision request requesting the information selected by the input unit 206, among the provided information names displayed as a list on the available information list screen (step S2104). As long as the available information list screen D2103 shown in, for example, FIG. 5 is on display, the CPU 201, upon selection of the "character string retrieval" button Bm100001 by way of the input unit 206, transmits the request to provide the "character string retrieval" information to the information provision intermediation apparatus 300, while upon selection of the "prize won" button Bm100003 by way of the input unit 206, on the other hand, the request to provide the "prize won" information is transmitted to the information provision intermediation apparatus 300.

In the information provision intermediation apparatus 300, the CPU 301 executing the information provision intermediation program 320 receives the information provision request from the terminal 200 (step S3205).

Then, the CPU 301 transmits an information provision request requesting the provision of the particular information to the information providing unit 400 for providing the information indicated by the provision requested information name included in the information provision request. The place of the information providing unit 400 constituting the destination of the information provision request can be grasped from the correspondence between the provided information address and the provided information name in the record extracted from the information provision intermediation definition table 370 in step S3203. Incidentally, the particular record is stored in the memory 302 in correspondence with the identification information that can specify the terminal 200, and therefore, can be acquired from the memory 302 based on the particular identification information. In the case where the provision request information name included in the information provision request transmitted from the terminal 200 is "character string retrieval", for example, the CPU 301 acquires the provided information address "192.0.2.8/inf1" corresponding to the provided information name "character string retrieval" from the extracted record, and transmits an information provision request including "character string retrieval" to the information providing unit 400 of the particular address. In the case where the provision requested information name included in the information provision request transmitted from the terminal 200 is "prize won", on the other hand, the provided information address "192.0.2.8/inf3" corresponding to the provided information name "prize won" is acquired from the extracted record, and an information provision request including "prize won" is transmitted to the information providing unit 400 of the particular address.

Further, the CPU 301 executing the information provision intermediation program 320 extracts the record with the provided information name "advertisement" of all the records extracted from the information provision intermediation definition table 370 in step S3203, and transmits an information provision request requesting the information on the corresponding advertisement to the information providing unit 400 of each provided information address (step S3206). In the case where the four records with the intermediation definition ID of "m100001", "m100003", "m100004" and "r234001" are acquired in step S3203, for example, the CPU 301 transmits an information provision request requesting the corresponding advertisement information to the information providing units 400 at two places of "192.0.2.8/ad1" and "192.0.2.3/ad5". The place "192.0.2.3/ad1" of the information providing unit 400 can be acquired from the provided information address field 370h of the record with the intermediation definition ID "m100001" having the provided information name "advertisement". Also, the place "192.0.2.3/ad5" of the information providing unit 400 can be acquired from the provided information address field 370h of the record with the intermediation definition ID "r234001" having the provided information name "advertisement".

Then, the CPU 301 executing the information provision intermediation program 320 receives the information (say, the information screen data) and/or the advertisement information from each information providing unit 400 to which the information provision request is transmitted in step S3206 (step S3207). The CPU 301 executing the information provision intermediation program 320, upon receipt of the advertisement information, adds the advertisement information (a plurality of advertisement information, if received) to the information screen data received, and transmits the information screen data after addition to the terminal 200. Upon receipt of no advertisement information, on the other hand, the received information screen data is transmitted as it is to the terminal 200 (step S3208).

At the terminal 200, the CPU 201 executing the information access program 210, upon receipt of the information screen data from the information provision intermediation apparatus 300, displays the information screen on the display unit 207 (step S2105).

Figure 6:
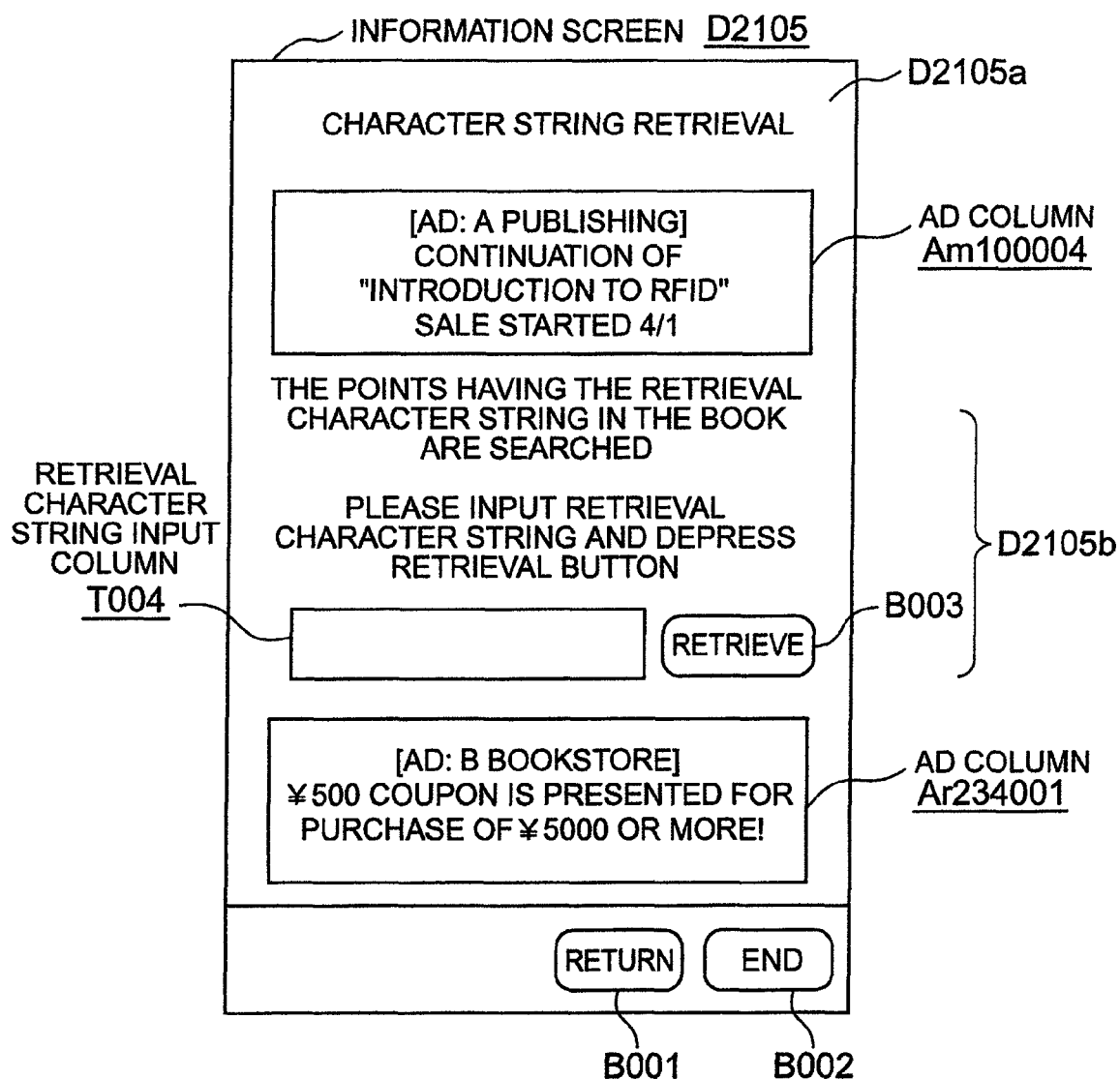
FIG. 6 is a diagram showing an information screen according to an embodiment of the invention.

FIG. 6 is a diagram showing the information screen according to an embodiment of the invention. FIG. 6 illustrates the information screen displayed in the case where the individual commodity ID read in step S2101 is "100100100" and the provided information selected in step S2104 and included in the provided information request is "character string retrieval".

The information screen D2105 includes the provided information name D2105a, an advertisement column Am100004, an advertisement column Ar234001, a retrieval display column D2105b, a return button B001 and an end button B002 on the screen. The retrieval display column D2105b includes the description of the provided information, a retrieval character string input column T004 and a retrieval button B003. The advertisement column Am100004 has displayed therein the advertisement information acquired from the place of the provided information address "192.0.2.8/ad1" indicated by the record with the intermediation definition ID "m10004" of the information provision intermediation definition table 370, such as the advertisement information from the manufacturer (publishing house). Also, the advertisement column Ar234001 has displayed therein the advertisement information acquired from the place with the provided information address "192.0.2.3/ad5" indicated by the record with the intermediation definition ID "r234001" of the information provision intermediation definition table 370, such as the advertisement information from the retailer (bookstore). The retrieval character string input column T004 is a column for inputting the character string for retrieving the point of description in a book. The character string is input to the retrieval character string input column T004 by the consumer operation of the input unit 206. With the retrieval button B003, upon selection by the consumer operation of the input unit 206, the CPU 201 executing the information access program 210 transmits a request (character string retrieval request) for retrieving the point of description in a book, of the character string input to the retrieval character string input column T004, to the information providing unit 400 at the information providing site providing the function of character string retrieval.

Returning to the description of FIG. 4, in the case where the information screen includes an input area input by the consumer, the CPU 201 executing the information access program 210 receives the input information input by the input unit 206 to the information screen, and upon selection of a predetermined button, transmits the information provision request including the input information to the information provision intermediation apparatus 300 (step S2106). In the case where the information screen D2105 shown in FIG. 6 is on display, for example, the retrieval character string is input to the retrieval character string input column T004 by the input unit 206, while upon selection of the retrieval button B003, the CPU 201 executing the information access program 210 transmits the information provision request including the retrieval character string (in the case under consideration, the character string retrieval result provision request).

After that, the CPU 301 executing the information provision intermediation program 320 executes the process of acting as an intermediary for giving the information provision request and the information provision response between the terminal 200 and the information providing unit 400. Upon receipt of the character string retrieval result provision request including the retrieval character string, for example, the CPU 310 transmits the retrieval character string in the received request to the information providing unit 400 of the information providing site having the character string retrieval function, and upon receipt of the character string retrieval result screen data from the information providing unit 400, transmits the character string retrieval result screen data to the terminal 200. As a result, the CPU 201 of the terminal 200 displays the character string retrieval result screen on the display unit 207.

This invention, though explained above based on one embodiment thereof, is not limited to such an embodiment but applicable to other various embodiments.

For example, the embodiment described above represents a case in which the traceability data are managed in a concentrative way by the traceability DB 360. Nevertheless, the invention is not limited to this embodiment, but the traceability data may be managed in a distributive configuration by the storage units held by the manufacturer and the retailer. Also, the manufacturer may manage the traceability data in a distributive way in the storage units installed in the factories thereof. Similarly, the retailer may manage the traceability data by distributing them among the storage units installed in the respective outlets thereof. In the case where the traceability data are managed in a distributive way, the CPU 301 may acquire the corresponding traceability data in step S3202 from the respective storage units managed in a distributive way.

According to the embodiments described above, the traceability data are managed by the traceability DB 360. Nevertheless, the invention is not limited to this configuration, but by employing a read/write RFID tag as the tag 100, the traceability data may be managed by writing them in the RFID tag. In such a case, the CPU 201 may read the traceability data together with the individual commodity ID from the tag 100 in step S2101, and transmit the individual commodity ID and the traceability data to the information provision intermediation apparatus 300 in step S2101. Further, the CPU 301 may receive the individual commodity ID and the traceability data from the terminal 200. In this case, the process of step S3202 is not required. Further, the traceability data may be managed in a distributive way between the tag 100 and the traceability DB 360. In this case, step S3202 is not omitted, and the traceability data managed in a distributive way may be acquired from the traceability DB 360.

Although the embodiments described above represent a case in which the available information list screen is kept generated and transmitted to the terminal 200, the invention is not limited to this configuration. As an alternative, in the case where the records acquired from the information provision intermediation definition table 370 in step S3203 include not more than one record having the provided information name other than "advertisement", the CPU 301 may omit steps S3204, S2103, S2104 and S3205, i.e. the process for the available information list screen, and may execute the process for the subsequent information screen. Incidentally, in the case where the records acquired from the information provision intermediation definition table 370 in step 3203 lack those having the provided information name other than "advertisement", the CPU 301 generates the information screen formed of only the advertisement and transmits it to the terminal 200 in step S3208.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information provision intermediation apparatus adapted to be connected, through a communication path, to a terminal used by the consumer and an information providing unit having an information providing site providing information and adapted to provide the terminal with the information of the information providing site provided by the information providing unit, comprising:
    a condition table storing, in correspondence with each other, an identifier of the information providing site and an information provision condition required for the distribution history information on a commodity in at least a part of the distribution path after manufacture at the time of providing the information of the information providing site;

a distribution history information acquisition unit acquiring the distribution history information on the commodity designated by the consumer;

an identifier acquisition unit acquiring the identifier of the information-available information providing site based on the acquired commodity distribution history information and the information provision condition;

an information intermediation unit acquiring, with an identifier acquired by the identifier acquisition unit, the information from the information providing site indicated by the identifier and transmitting the acquired information to the terminal;

wherein the commodity carries a RFID tag storing the distribution history information of the commodity; and wherein the distribution history information acquisition unit acquires the distribution history information from the terminal.

2. An information provision intermediation apparatus adapted to be connected, through a communication path, to a terminal used by the consumer and an information providing unit having an information providing site providing information and adapted to provide the terminal with the information of the information providing site provided by the information providing unit, comprising:

a condition table storing, in correspondence with each other, an identifier of the information providing site and an information provision condition required for the distribution history information on a commodity in at least a part of the distribution path after manufacture at the time of providing the information of the information providing site;

a distribution history information acquisition unit acquiring the distribution history information on the commodity designated by the consumer;

an identifier acquisition unit acquiring the identifier of the information-available information providing site based on the acquired commodity distribution history information and the information provision condition;

an information intermediation unit acquiring, with an identifier acquired by the identifier acquisition unit, the information from the information providing site indicated by the identifier and transmitting the acquired information to the terminal;

wherein the distribution history information includes an individual commodity ID of the commodity, a strategic point ID for uniquely identifying the strategic point in the distribution path where the commodity of the individual commodity ID is located, and business event specifying information specifying a business event engaged in by the commodity of the individual commodity ID at the strategic point, and wherein the information provision condition includes the condition for at least one of the individual commodity ID, the strategic point ID and the business event specifying information.

3. The information provision intermediation apparatus according to claim 2, wherein the information provision condition includes the condition for the strategic point ID and the business event specifying information.

4. The information provision intermediation apparatus according to claim 2, wherein the information provision condition includes the condition for the individual commodity ID and the business event specifying information.

5. The information provision intermediation apparatus according to claim 2, wherein the distribution history information further includes the date/hour information at which the distribution history information is generated, wherein the information provision condition includes the condition for the individual commodity ID and the latest business event specifying information, and wherein the identifier acquisition unit specifies the latest business event specifying information in the distribution history information based on the date/hour information, and based on the condition for the specified business event specifying information and the business event specifying information for the information provision condition, acquires the identifier of the information providing site capable of providing the information.

6. The information provision intermediation apparatus according to claim 5, wherein the condition for the latest business event specifying information is the business event specifying information for specifying the business event before the sale of the commodity, and wherein the identifier of the information providing site corresponding to the information provision condition is the identifier of the information providing site providing the information in the commodity description.

7. The information provision intermediation apparatus according to claim 2, wherein the information provision condition includes the term before which the information in the information providing site can be provided.

8. An information provision intermediation apparatus adapted to be connected, through a communication path, to a terminal used by the consumer and an information providing unit having an information providing site providing information and adapted to provide the terminal with the information of the information providing site provided by the information providing unit, comprising:

a condition table storing, in correspondence with each other, an identifier of the information providing site and an information provision condition required for the distribution history information on a commodity in at least a part of the distribution path after manufacture at the time of providing the information of the information providing site;

a distribution history information acquisition unit acquiring the distribution history information on the commodity designated by the consumer;

an identifier acquisition unit acquiring the identifier of the information-available information providing site based on the acquired commodity distribution history information and the information provision condition;

an information intermediation unit acquiring, with an identifier acquired by the identifier acquisition unit, the information from the information providing site indicated by the identifier and transmitting the acquired information to the terminal;

a plurality of the information providing sites, a select screen transmitter transmitting a select screen for selecting any one of the plurality of information providing sites to the terminal in the case where the identifier acquisition unit acquires the identifiers of the plurality of the information providing sites, and a select receiver receiving the information providing site selected from the select screen by the terminal, wherein the information intermediation unit acquires the information from the information providing site received by the select receiver and transmits the information to the terminal, wherein the information providing site includes an advertisement information providing site providing the advertisement information, and wherein the select screen transmitter, upon acquisition of the identifiers of a plurality of the information providing sites other than the advertisement information providing site providing the advertisement information, transmits the select screen for selecting an information providing site from those other than the one providing the advertisement information.

9. The information provision intermediation apparatus according to claim 8, wherein the information intermediation unit, upon acquisition of the identifier of the advertisement information providing site by the identifier acquisition unit, acquires the information from the information providing site received by the select receiver, acquires the information also from the advertisement information providing site, and transmits the information from the information providing site and the information from the advertisement information providing site to the terminal.

10. An information provision intermediation apparatus adapted to be connected, through a communication path, to a terminal used by the consumer and an information providing unit having an information providing site providing information and adapted to provide the terminal with the information of the information providing site provided by the information providing unit, comprising:

a condition table storing, in correspondence with each other, an identifier of the information providing site and an information provision condition required for the distribution history information on a commodity in at least a part of the distribution path after manufacture at the time of providing the information of the information providing site;

a distribution history information acquisition unit acquiring the distribution history information on the commodity designated by the consumer;

an identifier acquisition unit acquiring the identifier of the information-available information providing site based on the acquired commodity distribution history information and the information provision condition;

an information intermediation unit acquiring, with an identifier acquired by the identifier acquisition unit, the information from the information providing site indicated by the identifier and transmitting the acquired information to the terminal; and wherein the commodity is a book;

wherein the information providing site includes a site providing the information to receive the character string for retrieving the point of description in the book and the information on the point of description of the character string in the book by retrieving the point of description, and wherein the information intermediation unit provides the terminal with the information for receiving the character string.

11. An information provision intermediation apparatus adapted to be connected, through a communication path, to a terminal used by the consumer and an information providing unit having an information providing site providing information and adapted to provide the terminal with the information of the information providing site provided by the information providing unit, comprising:

a condition table storing, in correspondence with each other, an identifier of the information providing site and an information provision condition required for the distribution history information on a commodity in at least a part of the distribution path after manufacture at the time of providing the information of the information providing site;

a distribution history information acquisition unit acquiring the distribution history information on the commodity designated by the consumer;

an identifier acquisition unit acquiring the identifier of the information-available information providing site based on the acquired commodity distribution history information and the information provision condition;

an information intermediation unit acquiring, with an identifier acquired by the identifier acquisition unit, the information from the information providing site indicated by the identifier and transmitting the acquired information to the terminal; and wherein the commodity is a book, wherein the information providing site includes an advertisement information providing site providing the advertisement information on the book, and wherein the information intermediation unit provides the terminal with the advertisement information on the book.

* * * * *